June 18, 1957
B. BARÉNYI
2,796,286
MOTOR VEHICLE WITH A STREAMLINED BODY
AND A CAP-LIKE CLOSURE MEMBER
Filed May 6, 1952
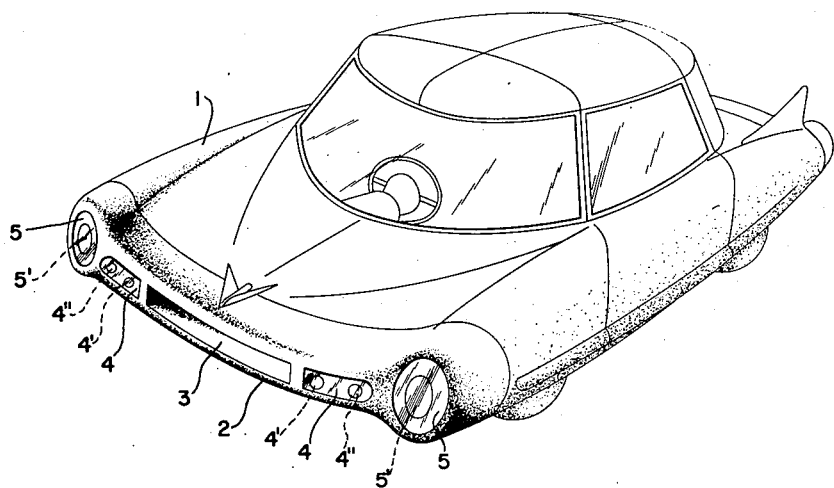
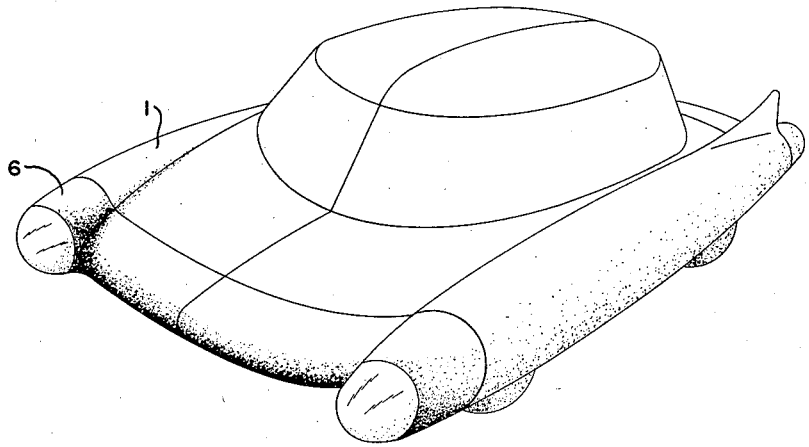
INVENTOR
Béla Barenyi
BY Dicke and Padlon
ATTORNEYS

2,796,286

MOTOR VEHICLE WITH A STREAMLINED BODY AND A CAP-LIKE CLOSURE MEMBER

Béla Barényi, Stuttgart-Rohr, Germany, assignor to Daimler-Benz Aktiengesellschaft, Stuttgart-Untertürkheim, Germany Application May 6, 1952, Serial No. 286,279

Claims priority, application Germany May 7, 1951

8 Claims. (Cl. 296—28)

The invention relates to a motor vehicle with streamlined body. The front and rear closures of the vehicle which are more or less curved in different directions render their production rather difficult. According to the invention this closure is to be produced separately in such a manner that the tapering ends at the front and/or rear of the body consisting of joining pieces extend cap-like over the entire width of the body and merge or pass over into the walls of the same.

The production of the motor vehicle body is advantageously simplified and its manufacturing costs are brought down by the present invention.

Moreover, the body of the motor vehicle, according to the invention, may still be simplified further in that the joining piece forms a one-piece casing for lighting implements, such as head lamps, lighted up license plates, intermittent lamps, stop lamps etc., and special casings for these implements thereby become unnecessary. The electrical installation of these lighting equipments may appropriately be secured to the body or the chassis of the motor vehicle.

The joining piece according to the invention may be made of metal, for instance steel, zinc casting etc., as well as of glassy plastics. The last-named construction has the advantage that the fitting of special glass panes for the lighting equipments can be dispensed with. In this case the parts of the joining piece which are not required to possess light transmitting qualities may be colored opaquely. In order to provide for an easy interchange of the joining piece, according to the invention in case of damage it may appropriately be secured to the body or the chassis of the motor vehicle in such a manner that it can be easily detached.

The body of the motor vehicle may advantageously be shaped so that the same element may be used for the joining pieces in front and in the rear, and, if so desired, only the light transmitting places of the joining pieces are differently shaped. In the case of joining pieces made of glassy plastics, the light transmitting places may be established by covering the joining pieces with different colors in front and in the rear thereof.

The drawing illustrates the object of the invention schematically, for purposes of illustration only, in two embodiments wherein:

Fig. 1 is a perspective view of the front part of a motor vehicle constructed according to the present invention with a metal joining piece, and Fig. 2 is a perspective view of the same vehicle with a joining piece made of glassy plastics.

In the drawing, reference numeral 1 designates the streamlined body of a motor vehicle constructed in any suitable manner. This body is open in front and, if so desired, also in the rear, and is closed in the construction according to the present invention as illustrated in Fig. 1, by a hood-like joining piece 2 made of sheet steel, zinc casting etc. extending over the entire width of the body 1. In its cross section this joining piece 2 is approximately U-shaped and in its base provided with openings 3, 4 and 5 of variable contours. Into the opening 3, for instance, a lighted license plate (not shown) may be inserted. The openings 4 may be provided for intermittent lamps and stop lamps and the openings 5 for head lamps, the lamps being schematically indicated in Figure 1 and designated by reference numerals 4', 4'' and 5'. The openings 3, 4 and 5 may be closed by suitable glass panes. The electrical equipments belonging to these implements are appropriately secured to the chassis or to the body of the motor vehicle, so that the joining piece 2 solely represents a casing common to all implements.

In the construction illustrated in Fig. 2, a joining piece 6 represents the front or rear closing of the body 1. It has substantially the same shape as the joining piece 2, but it is made of glassy plastics and has no openings, but is so designed that certain parts of its base form the panes for the lighting equipments, such as lighted license plates, intermittent turn indicator lamps and stop lamps, and head lamps. The remaining part of its wall may be colored opaquely. In both constructions the joining pieces 2 and 6 may appropriately be fixed easily detachable at the body 1 or the chassis of the motor vehicle, for instance by means of bolted joints or automatically engaging fastenings. As glassy plastics polymethacryl acid ester may be used.

In both constructions, according to Figures 1 and 2, the cap-like closure members or joining pieces 2 and 6 are so constructed as to include an essentially flat center portion which with the upper surface thereof lies below the lateral portions thereof. The transition from the essentially flat center portion to the lateral portions of the cap-like closure members or joining pieces 2 and 6 takes place by continuous surfaces in an essentially straight or rectilinear manner so as to provide a smooth transition.

The motor vehicle body is also provided with an essentially flat center portion which with the upper surface thereof lies below the lateral portions of the vehicle body. The cap-like closure members or joining pieces 2 and 6 which are constructed essentially symmetrical about a horizontal plane merge along the entire upper surface thereof with the body walls of the vehicle in such a manner as to avoid any offsets in the direction toward the center of the vehicle.

What I claim is:

1. A motor vehicle with a streamlined body having body walls, said streamlined body walls extending in essentially longitudinally straight surfaces at the ends thereof and terminating at least at one end of the vehicle in a flat manner and extending at said one end beyond the wheel base thereof, said streamlined body including at said one end a center wall portion and side wall portions, said center wall portion being disposed with the upper surface thereof below said side wall portions and being more flat that said side wall portions, a cap-like closure member of essentially U-shaped cross section to provide spaced flange portions, said cap-like closure member being provided at said one end and being supported by said body walls and extending over the entire width thereof, the spaced flanged portions of said cap-like closure member passing over into said essentially straight-surfaced body walls in continuation thereof, said cap-like closure member also including a center wall portion and side wall portions, the center wall portion of said cap-like closure member being disposed at least in part with the upper surface thereof below said last-mentioned side wall portions and extending in the transverse direction of the vehicle in an essentially flat manner, and the transition from the center portion of said cap-like closure to the side portions thereof taking place by continuous surfaces in an essentially straight manner.

2. A motor vehicle according to claim 1 wherein said vehicle includes cap-like closure members at both ends thereof, the contours of said cap-like closure members being formed substantially uniformly for both the front and rear end of said vehicle.

3. A motor vehicle according to claim 2, wherein said cap-like closure members are provided with light-transmitting places for passing therethrough light signals, said light transmitting places in said cap-like closure members being shaped differently for respective front and rear closure members.

4. A motor vehicle according to claim 1, wherein said cap-like closure member forms a unitary structure constituting the casings adapted to accommodate the usual electrical implements including head lamps, turn indicator lamps, and license plate lamps.

5. A motor vehicle with a streamlined body having body walls, said body walls extending in essentially longitudinally straight surfaces at the ends thereof and terminating at least at one end of the vehicle in a substantially flat manner and extending thereat beyond the vehicle wheels, said body having at said end lateral wall portions and a center wall portion therebetween, said center wall portion being substantially flat along the upper part thereof and lying below said lateral wall portions, and a cap-like closure member essentially symmetrically shaped with respect to a horizontal plane for at least one end of said body and supported thereby, said cap-like closure member being of essentially U-shaped cross section and extending over the entire width of said body, said cap-like closure member having lateral portions and a center portion therebetween with at least part of said last-mentioned center portion lying below the last-mentioned lateral portions, the leg portions of said U-shaped cap-like closure member passing over into said essentially straight-surfaced body walls, said last-mentioned center portion extending in an essentially flat manner in the transverse direction of the vehicle, and the transition from the center portion of said cap-like closure to the side portions thereof taking place by continuous uninterrupted surfaces.

6. A motor vehicle according to claim 5 wherein said cap-like closure member is made of plastic.

7. A motor vehicle according to claim 6, wherein said cap-like closure member simultaneously constitutes the casings for the electrical lighting implements adapted to be accommodated therein.

8. A motor vehicle according to claim 7, wherein the portions of said cap-like closure member lying directly in front of the lighting implements adapted to be accommodated therein are made of light transmitting material.

References Cited in the file of this patent

UNITED STATES PATENTS

| | | |
|---|---|---|
| D. 167,905 | Muller | Oct. 7, 1952 |
| 1,523,263 | Henninger | Jan. 13, 1925 |
| 2,221,054 | Luker | Nov. 12, 1940 |
| 2,612,964 | Hobbs | Oct. 7, 1952 |

FOREIGN PATENTS

| | | |
|---|---|---|
| 976,255 | France | Oct. 25, 1950 |
| 1,012,467 | France | Apr. 16, 1952 |
| 507,957 | Great Britain | June 23, 1939 |
| 548,086 | Great Britain | Sept. 24, 1942 |
| 103,358 | Switzerland | Feb. 1, 1924 |